United States Patent
Evgenyevich et al.

(10) Patent No.: US 10,060,301 B2
(45) Date of Patent: Aug. 28, 2018

(54) GAS TURBINE UNIT OPERATING MODE AND DESIGN

(71) Applicant: OTKRYTOE AKTSIONERNOE OBSHCHESTVO GAZPROM, Moscow (RU)

(72) Inventors: Aksyutin Oleg Evgenyevich, Moscow (RU); Eliseev Yury Sergeevich, Moscow (RU); Ishkov Aleksandr Gavrilovich, Moscow (RU); Kazaryan Varazdat Amayakovich, Moscow (RU); Klychkov Mikhail Vladimirovich, g.Samara (RU); Petrov Vitaly Silvestrovich, g.Samara (RU); Stolyarevsky Anatoly Yakovlevich, Moscow (RU); Fedorchenko Dmitry Gennadyevich, g.Samara (RU); Khloptsov Valery Gennadyevich, Moscow (RU)

(73) Assignee: PUBLICHNOE AKTSIONERNOE OBSHCHESTVO "GAZPROM", Moscow (RU)

( * ) Notice: Subject to any disclaimer, the term of this patent is extended or adjusted under 35 U.S.C. 154(b) by 335 days.

(21) Appl. No.: 14/395,905

(22) PCT Filed: Dec. 27, 2013

(86) PCT No.: PCT/RU2013/001176
§ 371 (c)(1),
(2) Date: Oct. 21, 2014

(87) PCT Pub. No.: WO2015/069137
PCT Pub. Date: May 14, 2015

(65) Prior Publication Data
US 2016/0017762 A1    Jan. 21, 2016

(30) Foreign Application Priority Data
Nov. 7, 2013  (RU) ............................... 2013149403

(51) Int. Cl.
*F01K 23/00*    (2006.01)
*F01K 23/10*    (2006.01)
(Continued)

(52) U.S. Cl.
CPC ............ *F01K 23/103* (2013.01); *F01K 21/04* (2013.01); *F01K 21/047* (2013.01); *F02C 3/30* (2013.01); *Y02E 20/16* (2013.01)

(58) Field of Classification Search
CPC ........ F23C 13/06; F22B 1/1861; F01K 23/10; F02C 6/18; F02C 3/20; F02C 3/22;
(Continued)

(56) References Cited

U.S. PATENT DOCUMENTS

| 4,723,407 A | 2/1988 | Goebel et al. |
| 4,725,380 A | 2/1988 | Pinto |

(Continued)

FOREIGN PATENT DOCUMENTS

| EP | 0207620 A2 | 1/1987 |
| EP | 1669572 A1 | 6/2006 |

(Continued)

OTHER PUBLICATIONS

International Search Report and Written Opinion, European Patent Office, dated Apr. 23, 2015.
(Continued)

*Primary Examiner* — Craig Kim
*Assistant Examiner* — Katheryn Malatek
(74) *Attorney, Agent, or Firm* — Notaro, Michalos & Zaccaria P.C.

(57) ABSTRACT

Gas turbine unit (GTV) provides compressed air and steam methane-hydrogen mixture to a combustion chamber to
(Continued)

enrich combustion products and cooling by evaporation or superheating of water steam. The temperature of heat exchange processes of the gas turbine unit is increased by additional fuel combustion in the steam-methane-hydrogen mixture postcombustion flow extracted at the output from the additional free work gas turbine, and before supply of steam-methane-hydrogen mixture to the combustion chamber it is previously cooled to the temperature of 200+240° C. with simultaneous differential condensation of water steam. The condensate is processed for preparation of methane steam-gas mixture and low pressure water steam which is passed through the additional free work gas turbine.

6 Claims, 1 Drawing Sheet

(51) Int. Cl.
*F01K 21/04* (2006.01)
*F02C 3/30* (2006.01)

(58) Field of Classification Search
CPC ... F02C 3/28; F02C 3/30; Y02E 20/16; Y02E 20/18
See application file for complete search history.

(56) References Cited

U.S. PATENT DOCUMENTS

| | | | |
|---|---|---|---|
| 2003/0221409 A1* | 12/2003 | McGowan | F02C 3/30 60/39.17 |
| 2008/0155984 A1* | 7/2008 | Liu | F01K 23/06 60/649 |

FOREIGN PATENT DOCUMENTS

| | | |
|---|---|---|
| EP | 1900923 A2 | 3/2008 |
| RU | 2000131473 | 12/2000 |
| RU | 2005102152 | 7/2006 |
| RU | 2385836 C2 | 4/2010 |
| RU | 2467187 C2 | 11/2010 |
| RU | 2435041 C2 | 11/2011 |
| RU | 2467187 | 11/2012 |
| SU | 1745990 A1 | 7/1992 |

OTHER PUBLICATIONS

Federal Institute of Industrial Property, Search Report for Application No. RU 2013149403/06(076906) dated Oct. 13, 2014.

* cited by examiner

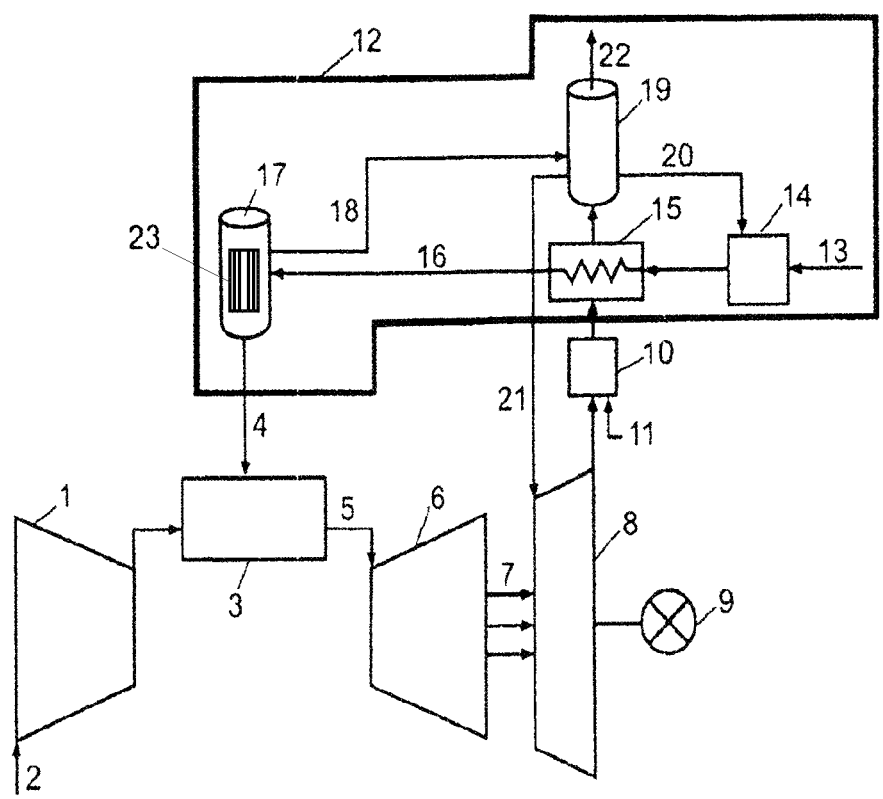

GAS TURBINE UNIT OPERATING MODE AND DESIGN

The proposed technology relates to gas turbine equipment used for operation resultant in electricity generation or as a drive for vehicles and long-distance gas pipeline compressors, particularly to an operating mode of a gas turbine unit (GTU) applied for power generation and transportation purposes and characterized by lower fuel consumption and exhaust gas heat recovery.

Using natural gas as a gas turbine fuel has contributed to the development of technologies enhancing the efficiency of gas turbine (GT) units by means of their combination with steam turbines (ST) and steam-mixed natural gas combustion methods.

The proposed technology also covers the design of a brand new GTU featuring a significant reduction of consumed power and emissions due to chemical conversions of the hydrocarbon gas steam mixture used for GT/ST feeding purposes.

The current state of the art includes a method for enhancing the efficiency of a combined cycle gas turbine (CCGT) unit, which provides for water injection into the compressor flow path, GT exhaust gas heat recovery in the heat recovery steam generator (HRSG), condensation of steam from the GT working medium in the direct-contact condenser and fuel burning in the combustion chamber with 1.05-1.1 excess air. The working medium temperature at the GT inlet is controlled by steam supply from HRSG to the completed combustion/one of the combustion chamber and regenerative bleeding of ST combined with GT within the CCGT unit or from the steam generator within the CCGT cycle arrangement in case of its stand-alone operation mode (Application RU No. 2005102152 of Jul. 10, 2006).

For implementing the above method the CCGT unit includes a main combustion air compressor, ST combined with GT, HRSG fed with GT exhaust gas, a direct-contact condenser for steam condensation and a steam generator ensuring the CCGT unit stand-alone operation.

A disadvantage of the said method and unit is the combined ST and GT use making the entire CCGT unit operation more complex and expensive.

The current state of the art also includes an operating mode and design of GTU equipped with a comprehensive system for advanced heat recovery and emissions reduction (Application RU No. 2000131473 of Jan. 20, 2003). The operating mode of such a unit provides for air compression and supply to the combustion chamber, gas fuel combustion in this chamber with the reduction of the excess air factor in the burning zone to 1.02-1.05 and to 1.05-1.10 in the case of liquid fuel, combustion products expansion in GT, the unburnt fuel aftercombustion downstream the turbine, water injection into the compressor and the combustion chamber.

The gas turbine unit (GTU) design under Application RU No. 2000131473 comprises a compressor and a combustion chamber with gas feeding tubing connected in series within the GTU air/gas circuit, a gas turbine (GT) mechanically coupled with the compressor and an electric generator, a pressurized economizer with heat carrier inlet and outlet tubing, a combustion products turboexpander mechanically coupled with the electric generator and feeding gas into a refrigeration user, a recuperative fuel heater with inlet/outlet fuel lines and heating conduits. The following equipment train is installed downstream GT within the gas circuit: an economizer or steam generator, a surface or contact-surface condenser as well as a drier, a surface gas-to-water heat exchanger, a silencer and chimney installed downstream the turboexpander. The compressor is connected to an air intake through a filter, the surface or contact-surface air-to-water heat exchanger and the silencer arranged in series along the inlet air circuit.

The above operating mode and unit are also characterized by low efficiency due to a lack of excess air and a reduction of the working medium flow rate in the GT flow path.

As known from the current state of the art, the operation of a combined cycle gas turbine (CCGT) unit is based on the so called STIG (steam injection gas turbine) cycle whereby steam is injected directly into the GT combustion chamber. During this cycle all the steam produced by the exhaust heat exchanger is supplied to the GT combustion chamber, the produced steam/gas mixture is then expanded in GT and after passing through the exhaust heat exchanger is emitted into the atmosphere.

Steam injection into the turbine flow path permits to increase the power by 60-70% and the efficiency by approximately 25% (rel.) without raising the gas temperature upstream the turbine. A disadvantage of the STIG cycle is a complete loss of the circuit water.

The prototype for the proposed technologies is a gas turbine unit (GTU) operating mode (Patent RU No. 2467187 of Nov. 20, 2012) that provides for supplying compressed air and a methane-based steam/gas mixture into the combustion chamber, expanding combustion products in GT, desuperheating the combustion products through the evaporation or reheat of the high-pressure (HP) steam, condensing the low-pressure (LP) steam contained in the combustion products, evaporating and reheating condensate resultant in the HP steam that is supplied to GTU where the incoming natural gas is successively mixed with the HP steam, heated in the first heat exchanger by the combustion products of the methane-based steam/gas mixture, passed through the catalytic reactor producing the methane-based steam/gas mixture which is then heated in the second heat exchanger, passed through the second catalytic reactor and supplied to the combustion chamber. The methane catalytic conversion products arc methane-based gases featuring 1-5% or above 20% hydrogen content.

The unit operated in the above mode has the design as follows: a gas generator train composed of an air compressor, a combustion chamber and a turbine with the installed downstream steam/gas mixture heat exchanger with its heated side connected to the methane catalytic reactor inlet, the outlet of which at the heated side is connected to the combustion chamber. Downstream the heat exchanger at its heated side is a steam generator with its steam circuit connected to the steam/gas mixture header inlet. The header inlet is connected to a natural gas source and its outlet—to the heat exchanger inlet at the heated side.

The GTU operating mode and design known from Patent RU No. 2467187 permit to only partially eliminate the disadvantages of the above technologies without reaching high energy efficiency of the fuel consumed. Another disadvantage is the limited capability of raising the unit output due to the effect of the working medium parameters upstream the turbine on its capacity. The technical task solved during the development of the proposed operating mode is to ensure the operation of GTU excluding the above disadvantages and achieving a maximum reduction of energy consumed and emissions.

The task solved in relation to developing the above unit design is to create a new type of GTU featuring more simplified design as well as higher output and efficiency resulting from the chemical regeneration of exhaust gas heat used for the steam catalytic conversion of natural gas along with the production of a methane/hydrogen or steam/methane/hydrogen (SMH) mixture in the GTU gas generator.

The technical result reached from the development of the proposed design of GTU versus its prototype is enhancing performances through more complete recovery of the exhausted combustion products energy.

The beneficial effect achieved during the development of the proposed GTU operating mode is reducing temperature and NOx emissions by 4-8 times, decreasing natural gas consumption by 14.8% as well as boosting efficiency by 3.41% (abs.).

The task in relation to the unit operation was solved based on the known GTU operating mode that provides for supplying compressed air and SMH mixture into the combustion chamber, expanding the SMX combustion products in GT, desuperheating it by evaporating or reheating the steam supplied to GTU where the incoming natural gas is mixed with the HP steam resulting in the production of the methane-based steam/gas mixture that is heated by the mentioned combustion products How in the heat exchanger and passed through the catalytic reactor for methane conversion with further production of the SMH mixture supplied into the GTU combustion chamber. According to the proposed mode the heat exchange processes temperature is increased by supplementary fuel combustion in the SMH mixture combustion products flow extracted at the ancillary power GT outlet. Before being supplied to the combustion chamber the SMH mixture is desuperheated to 200-240° C. with simultaneous partial condensation of its steam and production of condensate. The latter is separated, evaporated and consumed during the production of the methane-based steam/gas mixture and the LP steam which is then passed through the ancillary power GT.

This mode is also featured by the fact that either methane, or natural gas, or the SMH mixture extracted from the catalytic reactor may be used as a fuel combusted in the SMH combustion products flow.

Another feature of this mode is that the methane-based steam/gas mixture in the heat exchanger is heated up to 600-640° C.

The mentioned technical result in relation to the design is reached through the use of GTU composed of a unit for producing the SMH mixture which is burnt in the combustion chamber of the gas generator train comprising an air compressor, a combustion chamber and GT connected to the SMH mixture production unit through a heat exchanger connected at the heating side to the inlet of a catalytic reactor for methane conversion, the outlet of which at the heating side is connected to the gas generator combustion chamber. Provision is made for a steam generator installed downstream the heat exchanger at its heating side and connected with its steam outlet to the inlet of a mixer fed with natural gas. The steam generator inlet is connected to a steam condensate source. According to the proposed design arrangement the gas generator train installed downstream GT contains an ancillary power GT under load and an afterburner for the SMH mixture combustion products connected with its outlet to the heat exchanger inlet and with its inlet—to the outlet of the ancillary power GT, the LP steam inlet of which is connected to the steam generator outlet.

The unit design is also featured by the fact that the steam generator is located in parallel to the afterburner and heat exchanger.

Another feature of the unit design is that the SMH mixture desuperheated at the catalytic reactor outlet is an additional source of steam condensate.

The proposed GTU operating mode provides for producing the SMH mixture characterized by higher hydrogen content by means of the combustion products heat recovery resulting in a significant reduction of emissions during its combustion as well as consumed power.

The topicality of heat recovery for highly efficient gas turbine units stems from the requirement for their higher efficiency and competitiveness as well as the need for repowering through the application of complex cycle GTUs in the power generation, gas pumping and transport sectors. Unlike the conventional arrangement of GTUs and steam/gas cycles with $CO_2$ trapping, a unit with chemical regeneration provides for using the exhaust gas heat for the steam catalytic conversion (reforming) of natural gas resulting in the formation of a methane/hydrogen or steam/methane/hydrogen mixture being the fuel for GTUs, with the bulk of the power generated by the gas turbine.

The highest thermodynamic efficiency of the GT waste heat recovery may be reached when producing chemical agents through this heat, the burning of which generates a high-temperature working medium consumed within the gas turbine cycle. One of these agents is hydrogen which is not just free from harmful combustion products but provides for higher turbine efficiency, enabling to operate with an extremely lean combustion mixture featuring a high excess air factor (up to $\lambda=9.8$ in case of hydrogen/air mixture). Significant air excess in the combustion chamber enables a considerable reduction of the exhaust gas temperature and unbelievably low NOx emissions, which nearly corresponds to the detection limit. At the same time, an increase of the working medium mass flow results in the turbine capacity growth. Moreover, using methane/hydrogen mixtures with high hydrogen content (up to 50%) as a fuel gas for GTUs, including those subject to rehabilitation, will enable not just to enhance performances substantially, but to reduce emissions greatly. According to the proposed technical solution natural gas is enriched with hydrogen through methane catalytic steam conversion, the endothermic nature of which requires the heat input. The extraction of heat from the combustion products exhausted from the gas turbine is effected both for producing steam, which is partially used in methane conversion whereby the residual How is supplied to the combustion chamber along with the methane/hydrogen mixture, and for heating the SMH mixture supplied to the catalytic reactor. This allows using the energy of combustion products exhausted from GT to the maximum extent. Raising the temperature of GTU heat exchange processes contributes to higher output of the SMH mixture with high hydrogen content, and this, in essence, considerably reduces emissions due to more complete fuel combustion.

Separating a certain part of steam from the SMH mixture is intended for boosting the combustion of SMH mixtures with high hydrogen content (up to 50%) and thereby enhancing GTU performances and reducing emissions noticeably. Extracting a certain part of steam condensate for its recycling in the unit process serves as an extra steam source.

As to the design, the expediency of applying an ancillary power GT within GTU is stipulated by a considerable increase of the unit capacity by means of feeding the ancillary turbine circuit with an extra steam-based working medium produced by the steam generator installed in parallel to the afterburner and connected with the HP steam outlet to the mixer inlet and with the LP steam outlet—to the ancillary power GT inlet. Equipping the unit with the afterburner also contributes to substantially increasing the output of the SMH mixture produced through methane catalytic conversion, the endothermic nature of which requires the heat input.

The steam generator inlet is connected to the catalytic reactor used for extracting steam condensate from the SMH mixture in such a way that the SMH mixture desuperheated at the catalytic reactor outlet would serve as an extra source of steam condensate, after the reheating of which the steam generator would produce the HP and LP steam.

The FIG. 1 shows a schematic diagram for GTU operating mode and design.

As can be seen from the diagram, GTU includes a gas generator train composed of: compressor (1) for compressing the air (2), combustion chamber (3) for combusting SMH mixture (4) and exhausting combustion products (5). GT (6) expanding combustion products (5) and producing LP combustion products (7) at the outlet, ancillary power GT (8) under load (9) and afterburner (10) with fuel (11).

Unit (12) producing SMH mixture (4) based on natural gas (13) includes mixer (14) producing a methane-based steam/gas mixture, heat exchanger (15) generating a heated methane-based steam/gas mixture (16) at its outlet, catalytic reactor (17) for the methane conversion generating SMH mixture (4) and steam condensate (18), steam generator (19) producing HP steam (20) and HP steam (21) with the extraction of desuperheated combustion products (22).

A GTU was designed to implement the proposed operation mode.

An example of GTU design is given below.

As per the drawing shown below, GTU comprises: unit (12) producing SMH mixture (4) combusted in combustion chamber (3) and a gas generator train that includes compressor (1) for compressing the air (2), combustion chamber (3) and GT (6), downstream which there are ancillary power GT (8) under load (9) and fuel-fed (11) afterburner (10) of SMH mixture (4) installed in series. Afterburner (10) is connected with its outlet to the inlet of heat exchanger (15) and with its inlet—to the outlet of ancillary power GT (8).

An electric generator, a natural gas compressor at a long-distance gas pipeline or a vehicle drive serve as load (9) for ancillary power GT (8).

Unit (12) producing SMH mixture (4) is functionally linked with the GTU gas generator through heat exchanger (15) and comprises mixer (14) fed with natural gas (13), heat exchanger (15) connected at the heating side at the inlet of catalytic reactor (17), the outlet of which at the heating side is connected to combustion chamber (3) of the gas generator. In order to increase the output of SMH mixture (4) and ensure its stabilization, catalytic reactor (17) can be divided into two reactors filled with the same catalyst.

Steam generator (19) connected with its HP steam outlet (20) to the inlet of mixer (14) and with its LP steam outlet (21)—to the inlet of ancillary power GT (8) is installed in parallel to afterburner (10) and heat exchanger (15) at its heating side.

The inlet of steam generator (19) is connected with its one end to catalytic reactor (17) to remove steam condensate (18) from desuperheated SMH mixture (4) and with the other end—to the outlet of heat exchanger (15). Thus, the SMH mixture desuperheated at the outlet 23 of catalytic reactor (17) serves as an extra source of steam condensate (18) for steam generator (19) producing HP steam (20) and LP steam (21).

An example of the proposed technical solution with regard to the GTU operating mode is given below.

Ancillary power GT (8) under load (9) is actuated by fuel combustion at unit (12) for producing SMH mixture (4). For this purpose combustion chamber (3) of the gas generator is simultaneously fed with SMH mixture (4) from catalytic reactor (17) and air (2) from compressor (1). Combustion products (5) from combustion chamber (3) are supplied to GT (6) where they, undergoing expansion, produce LP combustion products (7) which are further fed the ancillary power GT (8) under load (9).

Unit (12) for producing SMH mixture (4) is operated through exhaust gas thermal energy, whereby the heat exchange process temperature is increased by the afterburning of fuel (11) in afterburner (10) in the LP SMH mixture (7) combustion products flow extracted at the outlet of ancillary power GT (8).

The oxidation of fuel (11) leads to higher temperature of the LP combustion products (7) flow supplied to heat exchanger (15) located downstream. Either methane, or natural gas or the SMH mixture are used as fuel (11) combusted in afterburner (10).

In order to produce SMH mixture (4), natural gas (13) is supplied to mixer (14) for blending it with HP steam (20) produced by steam generator (19). The methane-based steam/gas mixture produced by mixer (14) is then supplied to heat exchanger (15), the heating flow of which is, as mentioned above, a reheated flow of combustion products of LP SMH mixture (7) leaving afterburner (10).

The methane-based steam/gas mixture is heated in heat exchanger (15) to 600-640° C. for producing the flow of methane-based steam/gas mixture (16) which is supplied at the outlet to catalytic reactor (17) for methane conversion. The combustion products flow desuperheated in heat exchanger (15) is supplied to steam generator (19) which provides for its aftercooling through evaporating and reheating HP steam (20) and LP steam (21), whereby the HP steam is supplied to mixer (14) and LP steam (21) passes through ancillary power GT (8) under load (9). Low-temperature combustion products (22) cooled down in steam generator (19) and containing low $NO_x$ are exhausted into the atmosphere.

As a result of the methane conversion process, catalytic reactor (17) produces SMH mixture (4) with preset parameters shown in the fable below.

At the outlet of catalytic reactor (17) SMH mixture (4) is preliminarily desuperheated in the gas-to-water heat exchanger (omitted in the diagram) embedded into reactor (17) to 200-240° C. with the simultaneous partial condensation of steam contained in mixture (4) and the formation of steam condensate (18) which is then used as an extra source of feed water for steam generator (19). For this purpose steam condensate (18) is separated, extracted from SMH mixture (4) and catalytic reactor (17) and then supplied to steam generator (19) where it is evaporated through the heat radiated by the SMH mixture (4) combustion products producing HP steam (20) supplied to mixer (14) and LP steam (21) passed through ancillary power GT (8) under load (9). Thus, unit (12) producing SMH mixture (4) simultaneously generates fuel for the gas generator, HP steam (20) and LP steam (21) which actuates ancillary power GT (8). Besides, unit (12) is used for separating and exhausting low-temperature and low-$NO_x$ combustion products (22) into the atmosphere.

The Table below shows the composition and thermal characteristics of the SMH mixture extracted from catalytic reactor (17).

TABLE

Composition and thermal characteristics of SMH mixture

| Thermal characteristics | Measuring unit | SMH mixture component | | | | | |
|---|---|---|---|---|---|---|---|
| | | $CO_2$ | $N_2$ | $CO$ | $H_2$ | $CH_4$ | $H_2O$ |
| Volume content | | 0.04042 | 0.00197 | 0.00412 | 0.16974 | 0.18518 | 0.59857 |
| Molar weight | kg/mol | 0.04401 | 0.02801 | 0.02801 | 0.00202 | 0.01604 | 0.01802 |
| Weight content | | 0.33804 | 0.01047 | 0.02196 | 0.06500 | 0.56453 | |
| Relative steam flow rate | | | | | | | 2.04933 |
| Enthalpy | kJ/kg | | | 36277.4 | | | |
| Mixture flow rate* | nm³/h | | | 4390.165 | | | |
| Mixture pressure | kgf/cm² | | | 29.98 | | | |
| Mixture temperature | ° C. | | | 586.12 | | | |

*Mixture flow rate is shown for natural gas inflow of 1 000 nm³/h.

In terms of dry gas, the concentration of hydrogen contained in the SMH mixture at the outlet of catalytic reactor (17) is nearly 40%.

The pressure of the SMH mixture (4) and HP steam (20) flows is maintained at 2.0-8.0 MPa being approximated as close as possible to GT (6) inlet pressure.

Catalytic reactor (17) in unit (12) can be divided into two reactors, whereby methane in methane-based steam/gas mixture (16) is converted alternately in the first and second catalytic reactors with no heat supply and using a single-type catalyst based on the following metals: nickel, iron, platinum, palladium, iridium or their compounds. The segmented briquette of the catalyst containing refractory compounds of heavy metals that absorb thermal neutrons is protected against the mechanical effect of melt. The cross-section of the segmented briquette frame is gear-shaped.

In order to increase the capacity of catalytic reactor (17), input natural gas (13) is pre-treated for sulfur removal purposes.

The invention claimed is:

1. A method of operating a gas turbine unit comprising:
supplying a compressed air and a steam, methane and hydrogen mixture into a combustion chamber of the gas turbine unit,
burning the steam, methane and hydrogen mixture in the combustion chamber to produce steam, methane and hydrogen mixture combustion products,
supplying the steam, methane and hydrogen mixture combustion products into a gas turbine,
expanding the steam, methane and hydrogen mixture combustion products in the gas turbine to produce a flow of low pressure steam, methane and hydrogen mixture combustion products at a gas turbine outlet,
wherein the steam, methane and hydrogen mixture supplied to the combustion chamber is produced by mixing natural gas with a high pressure steam resulting in the production of a methane-based steam/gas mixture flow that is heated by the flow of low pressure steam, methane and hydrogen mixture combustion products in a heat exchanger and further is passed through a catalytic reactor for methane conversion to produce the steam, methane and hydrogen mixture at an outlet of the catalytic reactor to provide the steam, methane and hydrogen mixture to the combustion chamber,
wherein before being supplied to the heat exchanger the flow of low pressure steam, methane and hydrogen mixture combustion products is fed to an inlet of an ancillary power turbine and further a temperature in the gas turbine unit is increased by a supplementary fuel combustion in the flow of low pressure steam, methane and hydrogen mixture combustion products extracted at an ancillary power turbine outlet,
wherein before being supplied to the combustion chamber the steam, methane and hydrogen mixture is desuperheated to 200° C. to 240° C. with a simultaneous partial condensation of steam to produce a steam condensate,
wherein the steam condensate is separated, evaporated and consumed during the production of the steam, methane and hydrogen mixture and low pressure steam, and
wherein the low pressure steam is further passed through the ancillary power turbine.

2. The method of operating the gas turbine unit as recited in claim 1, wherein either methane or the steam, methane and hydrogen mixture may be used as a fuel combusted in the flow of low pressure steam, methane and hydrogen mixture combustion products.

3. The method of operating the gas turbine unit as recited in claim 1, wherein the methane-based steam/gas mixture flow in the heat exchanger is heated up to 600-640° C.

4. A gas turbine unit comprising:
a steam, methane and hydrogen mixture production unit for producing a steam, methane and hydrogen mixture, which is burnt in a combustion chamber of a gas generator train,
wherein the gas generator train comprises an air compressor, the combustion chamber and a gas turbine connected to the steam, methane and hydrogen mixture production unit through a heat exchanger,
wherein a heating side of the heat exchanger is connected to an inlet of a catalytic reactor for methane conversion, an outlet of the catalytic reactor is connected to the combustion chamber of the gas generator train, a steam generator is installed downstream of the heat exchanger at the heating side of the heat exchanger, a high-pressure steam outlet of the steam generator is connected to an inlet of a mixer fed with natural gas and a steam generator inlet is connected to a steam condensate source;
wherein the gas generator train comprises an ancillary power turbine under a load downstream of the gas turbine and an afterburner for burning steam, methane and hydrogen mixture combustion products,
wherein the afterburner is connected to a heat exchanger inlet, an inlet of the afterburner is connected to an outlet of the ancillary power turbine, and a low pressure steam inlet of said ancillary power turbine is connected to a low pressure steam generator outlet.

5. The gas turbine unit of claim 4, wherein the steam generator is located in series with the afterburner and the heat exchanger.

6. The gas turbine unit of claim 4, wherein the steam, methane and hydrogen mixture is desuperheated at the outlet of the catalytic reactor provides the steam condensate source.

\* \* \* \* \*